(12) United States Patent
Shibuya et al.

(10) Patent No.: US 7,081,333 B2
(45) Date of Patent: Jul. 25, 2006

(54) RADIATION IMAGE CONVERSION PANEL AND PREPARATION METHOD THEREOF

(75) Inventors: Hideki Shibuya, Tokyo (JP); Kuniaki Nakano, Uenohara-machi (JP); Shigetami Kasai, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 10/942,025

(22) Filed: Sep. 16, 2004

(65) Prior Publication Data

US 2005/0061993 A1    Mar. 24, 2005

(30) Foreign Application Priority Data

Sep. 18, 2003  (JP) .............................. 2003-326115

(51) Int. Cl.
- G21K 4/00 (2006.01)
- H05B 33/14 (2006.01)
- C23C 16/08 (2006.01)
- G03C 1/496 (2006.01)
- G03C 1/74 (2006.01)

(52) U.S. Cl. .................. 430/496; 430/21; 430/139; 250/484.4; 427/157; 427/255.39

(58) Field of Classification Search .............. 430/21, 430/139, 496; 250/484.4; 252/301.6, 301.4; 427/157, 255.39
See application file for complete search history.

(56) References Cited

U.S. PATENT DOCUMENTS

| | | | |
|---|---|---|---|
| 2002/0104974 A1* | 8/2002 | Hosoi | 250/584 |
| 2004/0016890 A1* | 1/2004 | Maezawa et al. | 250/484.4 |
| 2004/0155224 A1* | 8/2004 | Nakano et al. | 252/301.4 H |
| 2004/0159801 A1* | 8/2004 | Kishinami et al. | 250/484.4 |
| 2004/0256572 A1* | 12/2004 | Miyake et al. | 250/484.4 |

FOREIGN PATENT DOCUMENTS

| EP | 1 489 156 A1 | 12/2004 |
|---|---|---|
| JP | 05249298 | 9/1993 |

* cited by examiner

*Primary Examiner*—Richard L. Schilling
(74) *Attorney, Agent, or Firm*—Finnegan, Henderson, Farabow, Garrett & Dunner, L.L.P.

(57) ABSTRACT

A radiation image conversion panel exhibiting improved resistance to peeling or shock as well as enhanced sharpness is disclosed, comprising on a support a stimulable phosphor layer composed of columnar phosphor crystals formed through gas phase deposition, wherein the stimulable phosphor layer exhibits an X-ray diffraction pattern meeting the following ratio ($I_2/I_1$) of the highest peak intensity $I_1$ and the second highest peak intensity $I_2$:

$$0.3 \leq I_2/I_1 \leq 1.0.$$

5 Claims, 3 Drawing Sheets

RADIATION IMAGE CONVERSION PANEL AND PREPARATION METHOD THEREOF

FIELD OF THE INVENTION

The present invention relates to a radiation image conversion panel comprising a stimulable phosphor layer which has been formed by a process of gas-phase deposition, and a preparation method thereof.

BACKGROUND OF THE INVENTION

There has been obtained a digitized radiographic image from subjects by the radiation image conversion method using a radiation image conversion panel having a stimulable phosphor layer. This radiation image conversion method is a process in which radiation rays having transmitted a subject are exposed onto the stimulable phosphor layer, whereby radiation-energy corresponding to the radiation transmission density of the respective portions of the subject is accumulated in a stimulable phosphor, thereafter, the radiation energy accumulated in the stimulable phosphor is emitted as photo-stimulated luminescence by excitation of stimulating light and the strength of the stimulated luminescence is converted to an electric signal, which is further converted to a visible image through imaging materials such as photographic material or an image display such as a CRT (Cathode Ray Tube) or a LCD (liquid Crystal Display).

It is well known that formation of a stimulable phosphor on a support by vapor-depositing a stimulable phosphor comprised of CsBr as a parent component has achieved a radiation image conversion panel exhibiting greatly enhanced sensitivity.

It is also known that constituting a stimulable phosphor layer with minute columnar crystals results in excellent sharpness. Since the minute columnar crystals exhibit a light-induced effect, in such a stimulable phosphor layer, stimulated luminescence is repeatedly reflected within the columnar crystals and reaches the bottom of the columnar crystals, while preventing the stimulated luminescence from scattering, thereby resulting in enhanced sharpness of the image formed by stimulated luminescence. As is disclosed in JP-A No. 5-249298 (hereinafter, the term "JP-A" refers to a Japanese Patent Application Publication), it is known to be effective to make uniform the direction of internal crystal growth in the stimulable phosphor layer, specifically at the time of forming the columnar crystals.

SUMMARY OF THE INVENTION

However, AX type phosphor which comprise the parent alkali halide such as CsBr and an activator such as Eu, exhibit relatively high thermal expansion coefficient and enhancing crystallinity results in a tendency of peeling off from the support and reduced shock resistance. Accordingly, not only enhanced sensitivity and superior sharpness but also enhanced resistance to peeling or shock are required in the stimulable phosphor layer.

It is therefore an object of this invention to provide a radiation image conversion panel comprising an image forming layer exhibiting enhanced resistance to peeling or shock as well as enhanced sensitivity and improved sharpness, and a preparation method thereof.

In one aspect the invention is directed to a radiation image conversion panel comprising a stimulable phosphor layer, characterized in that when subjected to powder X-ray diffractometry at incident angles within the range of from 10° to 70°, the stimulable phosphor layer exhibits an X-ray diffraction pattern meeting the following requirement:

$$0.3 \leq I_2/I_1 \leq 1.0$$

wherein $I_1$ is a first peak intensity and $I_2$ is a second peak intensity when subjected to powder X-ray diffractometry at incident angles within the range of from 10° to 70°.

In another aspect the invention is directed to a method of preparing the radiation image conversion panel described above, comprising forming a stimulable phosphor layer comprised of a stimulable phosphor deposited on a support by a process of gas phase deposition using a vacuum deposition apparatus.

According to this invention, there have been achieved radiation image convention panels exhibiting enhanced sensitivity and improved sharpness and having a stimulable phosphor layer exhibiting improved resistance to release and shock.

DETAILED DESCRIPTION OF THE EMBODIMENTS

Figure 1:
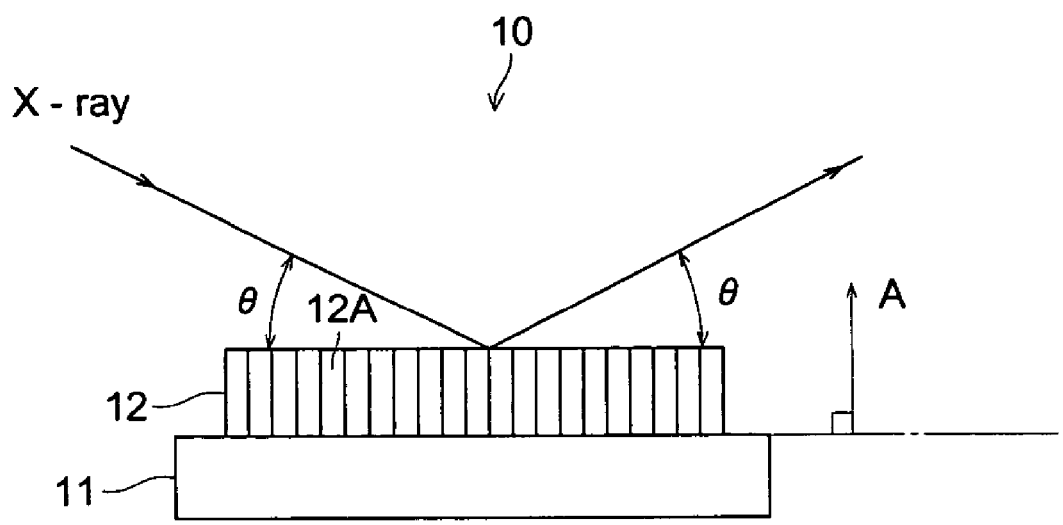
FIGS. 1(a) and 1(b) illustrate a radiation image conversion panel.
Figure 1:
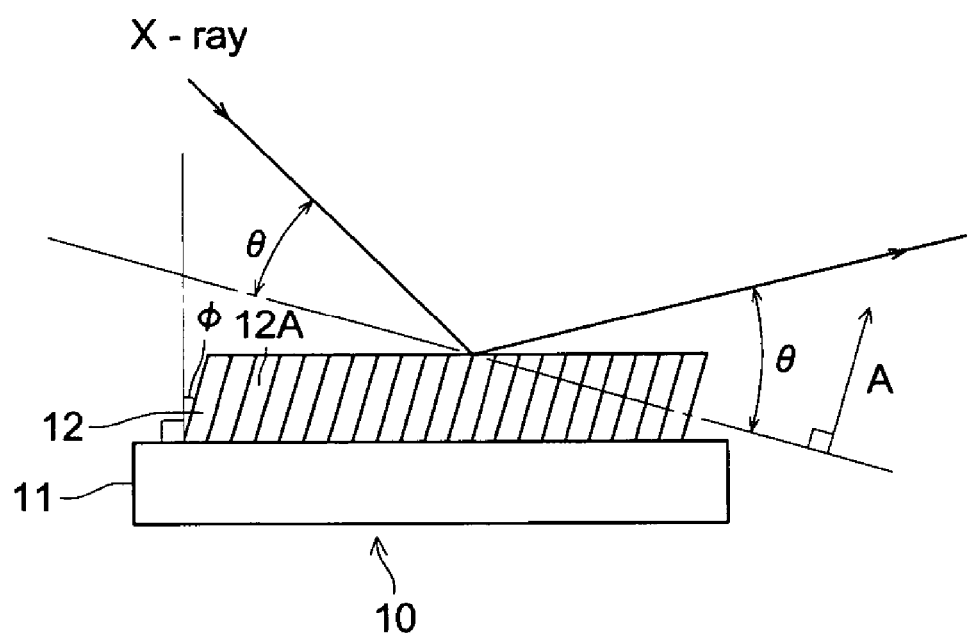

As shown in FIG. 1(a), a radiation image conversion panel comprises a support (11) provided thereon with a stimulable phosphor layer (12) comprising a stimulable phosphor formed of columnar crystals (12a). The columnar crystals are formed by crystal growth of a stimulable phosphor through gas phase deposition. There may optionally be provided a protective layer on the stimulable phosphor layer to protect the stimulable phosphor layer.

The support (11) which can be optimally chosen from commonly known materials used for a support of conventional radiation image conversion panels, preferably is a quartz glass sheet, a sheet of metal such as aluminum, iron, tin, or chromium or a carbon fiber-reinforced resin sheet in terms of forming the stimulable phosphor layer (12) by a process of gas phase deposition.

The support (11) preferably has a resin layer to smoothen the surface thereof. Thus, the resin layer preferably contains compounds such as polyimide, polyethylene terephthalate, paraffin and graphite and the layer thickness is preferably 5 μm to 50 μm. The resin layer may be provided on the surface of the support, the opposite side or both sides thereof. Means for providing a resin layer on the support (11) include, for example, a pasting method and a coating method. In the pasting method, a pressure roller is employed, in which heating is made preferably at a temperature of 80 to 150° C. under a pressure of 4.90×10 to 2.94×10² N/cm at a transporting speed of 0.1 to 2.0 m/sec.

The stimulable phosphor layer is comprised of a stimulable phosphor formed of columnar crystals. Thus, the stimulable phosphor layer is formed by depositing the stimulable phosphor in the gas phase on the support to grow the phosphor crystals in a columnar form. In the formation of the stimulable phosphor layer, the direction of a crystal lattice plane is controlled so that the stimulable phosphor layer exhibits an X-ray diffraction pattern meeting the following requirement:

$$0.3 \leq I_2/I_1 \leq 1.0$$

wherein $I_1$ is the first peak intensity and $I_2$ is the second peak intensity, when subjected to powder X-ray diffractometry at X-ray incident angles over a range of 10° to 70°.

The X-ray incident angle refers to an acute angle (θ) between the direction of an incident X-ray and a plane perpendicular to the direction of the highest growth rate in the formation of the stimulable phosphor layer (12).

The first peak intensity ($I_1$) refers to the intensity of a peak exhibiting the maximum (or highest) intensity in an X-ray diffraction pattern obtained when an X-ray is allowed to enter the stimulable phosphor layer (12) at a prescribed incident angle (θ) from an X-ray source, and the quantity of an X-ray which reaches an X-ray detector is measured. Similarly, the second peak intensity (I) refers to the intensity of the peak exhibiting the second highest intensity. In the case of being synonymous with each other as a crystal plane, for example, a (100) plane and a (200) plane, they are treated as distinct peaks. X-rays usable in this invention include, for example, CuKα (1.54 Å).

The stimulable phosphor layer is subjected to powder X-ray diffractometry at X-ray incident angles over a range of 10° to 70° with respect to the crystal lattice plane normal to the direction of the highest growth rate. The direction of the highest growth rate during the formation of the stimulable phosphor layer refers to the direction of growing the columnar crystals or the direction of the columnar crystals being elongated. The direction of the highest growth rate is usually a direction perpendicular to the surface of the support (11), as shown in FIG. 1(*a*), in which the highest growth rate of columnar phosphor crystals is in the direction indicated by the arrow "A". There is also included a case of being inclined at an angle (φ) from the direction perpendicular to the surface of the support (11), as shown in FIG. 1(*b*). In this invention, both cases, as shown in FIGS. 1(*a*) and 1(*b*), are included. It is preferred that the direction of the highest growth rate be perpendicular to the surface of the support.

Figure 2:
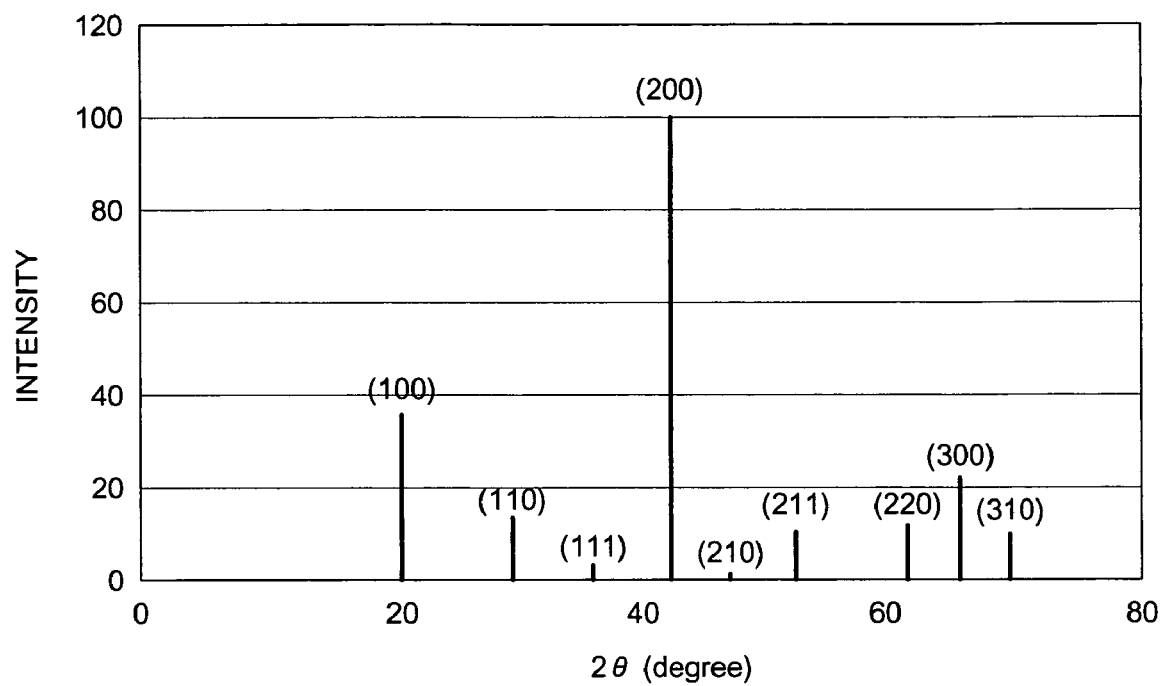
FIG. 2 illustrates an X-ray diffraction pattern.

When the ratio ($I_2/I_1$) of the second peak intensity ($I_2$) to the first peak intensity ($I_1$) is 0.3 or more in the stimulable phosphor layer (12), the crystal lattice planes are not uniform in direction and crystals easily adhere with each other, resulting in enhanced resistance to release of the stimulable phosphor layer (12) from the support (11) and enhanced shock resistance of the stimulable phosphor layer (12). An $I_2/I_1$ value of less than 0.3 results in excessively increased crystallinity, easily leading to peeling and reduced mechanical strength. The crystal lattice plane exhibiting the first peak preferably is a (x00) plane, in which x is 1, 2 or 3 (preferably 1 or 2). Thus, in one of the preferred embodiments of this invention, the highest peak is assigned to the foregoing lattice plane (x00), in which x is 1, 2 or 3 (preferably 1 or 2). FIG. 2 illustrates an X-ray diffraction pattern relating to this invention.

Such stimulable phosphor layer (12) preferably contains a stimulable phosphor comprised of an alkali halide as a parent, which is represented by the following formula (1):

$$M^1X \cdot aM^2X'_2 \cdot bM^3X''_3 : eA \quad (1)$$

wherein $M^1$ represents an alkali metal selected from the group consisting of Li, Na, K, Rb and Cs; $M^2$ represents a divalent metal selected from the group consisting of Be, Mg, Ca, Sr, Ba, Zn, Cd, Cu and Ni; $M^3$ represents a trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X, X' and X" each represent a halogen atom selected from the group consisting of F, Cl, Br and I; A represents a metal selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are respectively $0 \leq a < 0.5$, $0 \leq b < 0.5$ and $0 < e < 1.0$.

In the stimulable phosphor represented by the foregoing formula (1), $M^1$ is an alkali metal selected from the group consisting of Li, Na, K, Rb and Cs, preferably an alkali metal selected from the group consisting of Rb and Cs, and more preferably a Cs atom.

$M^2$ is a divalent metal selected from the group consisting of Be, Mg, Ca, Sr, Ba, Zn, Cd, Cu and Ni; and preferably a divalent metal selected from the group consisting of Be, Mg, Ca, Sr and Ba.

$M^3$ is a trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; and preferably a trivalent metal atom selected from the group consisting of Y, Ce, Sm, Eu, Al, La, Gd, Lu, Ga and In.

A is a metal selected from the group consisting of Eu, Tb, In, Ce, Tm, Dy, Pr, Ho, Nd, Yb, Er, Gd, Lu, Sm, Y, Tl, Na, Ag, Cu and Mg; of these, Eu atom is preferred.

X, X' and X" each represent a halogen atom selected from the group consisting of F, Cl, Br and I; a halogen atom selected from the group consisting of F, Cl and Br is preferred and Br atom is more preferred.

In the foregoing formula (1), b is $0 \leq b < 0.5$ and preferably $0 \leq b < 10^{-2}$.

Stimulable phosphors of the foregoing formula (1) can be prepared from the following raw materials (a) to (c) according to the procedure described below:

(a) one or more compounds selected from NaF, NaCl, NaBr, NaI, KF, KCl, KBr, KI, RbF, RBCl, RbBr, RbI, CsF, CsCl, CsBr, and CsI is usable;

(b) one or more compounds selected from $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2 \cdot 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$ and $NiI_2$ is usable;

(c) Sc, Y, La, Ce, Pr, Nd, Pm, Sm, Eu, Gd, Tb, Dy, Ho, Er, Tm, Yb, Lu, Al, Ga and In.

Corresponding to the composition of a stimulable phosphor to be prepared, phosphor raw materials are optimally chosen from the foregoing (a) to (c); weighed so as to satisfy the numerical range of "a", "b" and "e" of the foregoing formula (1), and then dissolved. In this regard, there may be conducted sufficient mixing using a mortar, ball mill or mixer mill. Then, a prescribed amount of an acid is added to adjust a pH value (C) of the thus obtained solution so as to fall within the range of 0<C<7, and then water is evaporated.

Further, the obtained raw material mixture is charged into a heat-resistant vessel such as a silica crucible or an alumina crucible and then placed in an electric furnace to be calcined. The calcination temperature preferably is 500 to 1000° C. The calcination time, depending on the charged amount of raw materials, calcination temperature and the like, preferably is 0.5 to 6 hrs.

As a calcinations atmosphere is employed a weakly reducing atmosphere such as a nitrogen gas atmosphere containing a small amount of hydrogen gas or a carbon dioxide atmosphere containing carbon monoxide, a nitrogen gas atmosphere, a neutral atmosphere such as an argon gas atmosphere, or a trace amount of oxygen-introduced weakly oxidizing atmosphere.

After completion of calcination under the foregoing condition, calcined material is taken out of the electric furnace and pulverized. Thereafter, powdered calcined material may again be charged into a heat resistant vessel and then placed in an electric furnace to be recalcined under the foregoing condition to further enhance emission luminance of the phosphor. When the calcined material is allowed to cool from the calcination temperature to room temperature, the intended phosphor can be obtained by taking out the calcined material from the electric furnace and allowing it to stand in an aerial atmosphere. In this regard, the calcined material may also be cooled in the same atmosphere as in the calcination, such as a weakly reducing atmosphere or a neutral atmosphere. Alternatively, the calcined material is moved from a heating section to a cooling section within the electric furnace, followed by rapidly cooling in a weakly reducing atmosphere, neutral atmosphere or weakly oxidizing atmosphere, thereby leading to further enhanced stimulated emission luminance of the phosphor.

The stimulable phosphor layer (12) can be formed by depositing the stimulable phosphor on one side of the support (11) by applying gas phase deposition methods to grow columnar phosphor crystals until reaching a desired layer thickness. The gas phase deposition methods usable in this invention include a vacuum deposition method (or vacuum evaporation method), a sputter deposition method, a CVD method, an ion plating method and other appropriate methods. Of these, the vacuum deposition method is preferred.

Figure 3:
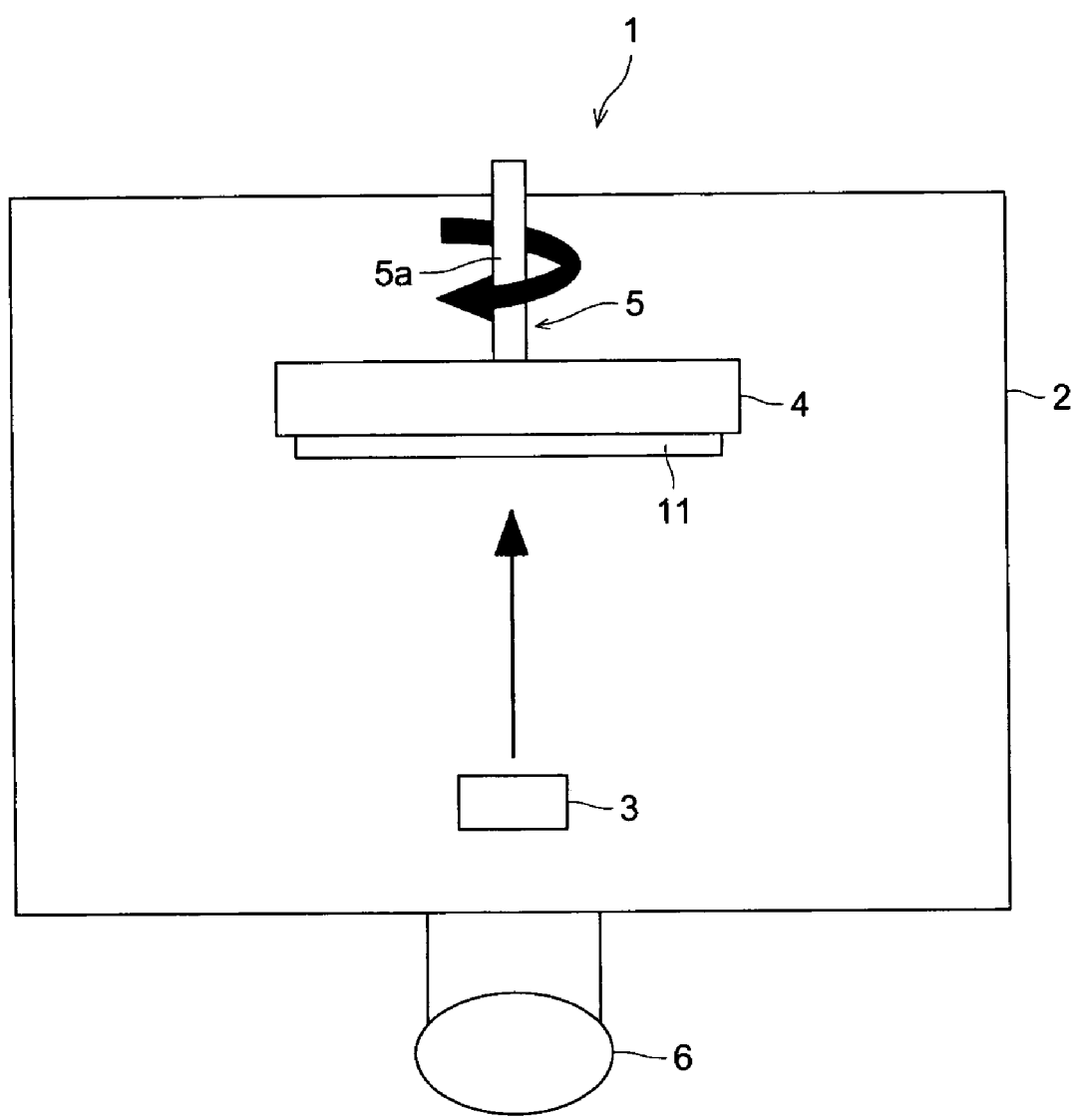
FIG. 3 illustrates a vacuum deposition apparatus.

Vacuum deposition can be performed using, for example, a vacuum deposition apparatus (1) shown in FIG. 3. The vacuum deposition apparatus (1) is provided with a vacuum vessel (2) and a vacuum pump (6) to evacuate the inside of the vacuum vessel (12) and to introduce atmospheric air; the interior of the vacuum vessel (2) is provided with an evaporation source (3) to evaporate or sublimate a stimulable phosphor by heating to deposit the resulting vapor onto a support (11), a support holder (4) to hold the support (11) and a support rotation mechanism (5) to rotate the support holder (4) to the evaporation source (3). In the vacuum deposition apparatus (1), a vapor evaporated from the evaporation source (3) is deposited onto the support (11) with rotating the support holder (4) by the support rotation mechanism (5) to form the stimulable phosphor layer (12).

To hold a stimulable phosphor and heat it by a resistance heating method, the evaporation source (3) may be composed of an aluminum crucible wound by a heater, or a boat or a heater of a high-melting metal. Besides the resistance heating method, electron beam heating or high-frequency induction heating is also applicable to heat the stimulable phosphor. Specifically, the resistance heating method is preferred in terms of being a relatively simple constitution, ease of handling and low price, and being applicable to a large number of materials. Further, the evaporation source (3) may be a molecular beam source using a molecular source epitaxial method.

There may be provided a shutter between the support (11) and the evaporation source (3) to shield a space of from the evaporation source (3) to the support (11). Proving the shutter prevents an unintended material adhered onto the stimulable phosphor surface being evaporated at the initial stage of evaporation and its adherence to the support (11).

The support holder (4) is preferably provided with a heater to heat the support (11). Heating the surface of the support (11) can separate or remove material adsorbed onto the support surface, and preventing generation of an impurity layer between the support surface and the stimulable phosphor, promoting closer contact and optimizing film characteristics of the stimulable phosphor layer.

The support rotation mechanism (5) is composed of, for example, a rotating shaft (5a) which rotates a support holder (4) while holding the support holder (4) and a motor (not shown in FIG. 3) which is arranged outside the vacuum vessel (2) and acts as a driving source for the rotating shaft.

Using the vacuum deposition apparatus (1) described above, a stimulable phosphor layer (12) can be formed on a support (11), according to the following procedure. First, the support (11) is mounted on the support holder (4). Then, the interior of the vacuum vessel is evacuated and regulated to the intended degree of vacuum. Thereafter, the support holder is rotated toward the evaporation source (3) by the support rotation mechanism (5). When the vacuum vessel reached a degree of vacuum allowing deposition, a stimulable phosphor is evaporated from the heated evaporation source (3) and deposits on the surface of the support (11) to grow the phosphor to the intended thickness. In this regard, the spacing between the support (11) and the evaporation source (3) preferably is 100 mm to 1500 mm. The vacuum vessel is maintained at a vacuum pressure of $1 \times 10^{-3}$ to $1 \times 10^{0}$ pa, and preferably $3 \times 10^{-3}$ to $3 \times 10^{-1}$ Pa.

The foregoing deposition process may be divided to plural times to form a stimulable phosphor layer (12). Further, using plural resistance heaters or electron beams in the deposition process, co-deposition can be performed to form the stimulable phosphor layer (12) concurrently with synthesis of an intended stimulable phosphor on the support (11). The substrate [such as support (11), protective layer or an interlayer] may optionally be cooled or heated during deposition. After completion of the deposition, the stimulable phosphor layer (12) may optionally be heated. Further, there may be conducted vacuum deposition in which gases such as $O_{02}$ or $H_2$ are introduced during deposition.

The thickness of the stimulable phosphor layer (12), depending on the objective of a radiation image conversion panel or the kind of a stimulable phosphor, is preferably 50 to 2000 μm, more preferably 50 to 1000 μm, and still more preferably 100 to 800 μm to achieve the effects of this invention. In the formation of the stimulable phosphor layer (12) through the gas-phase deposition process, the support is preferably maintained at a temperature of room temperature (rt) to 300° C., and more preferably 50 to 200° C. during the formation of the stimulable phosphor layer (12). Further, in the vacuum deposition process, adjustments of the degree of vacuum of the deposition apparatus (1), the temperature of the support (11), the deposition rate and the direction of vapor stream from the evaporation source to the surface of the support (11) can control the value of a ratio of the second peak intensity ($I_2$) to the first peak intensity ($I_1$), that is, $I_2/I_1$.

After formation of the stimulable phosphor layer (12), as described above, a protective layer may optionally be provided on a side of the stimulable phosphor layer (12) opposite the support (11) to physically or chemically protect the stimulable phosphor layer (12). The protective layer may be formed by coating a coating solution as a protective layer on the surface of the stimulable phosphor layer (12) or by allowing a protective layer previously formed to adhere onto the stimulable phosphor layer (12). Materials used for the protective layer include those which are typically used for protective layers. Examples thereof include cellulose acetate, nitrocellulose, polymethyl methacrylate, polyvinyl butyral, polyvinyl formal, polycarbonate, polyester, polyethylene terephthalate, polyethylene, polyvinylidene chloride, nylon, polytetrafluoroethylene, polytrifluoroethylene, copolymer of terafluoroethylene and hexafluoropropylene, copolymer of vinylidene chloride and vinyl chloride, and copolymer of vinylidene chloride and acrylonitrile. Further, a transparent glass substrate may be used as a support. Furthermore, inorganic material such as SiC, $SiO_2$, SiN, and $Al_2O_3$ may be allowed to deposit by means of the vacuum evaporation or sputtering method to form the protective layer. The thickness of a protective layer is preferably 0.1 to 2,000 μm.

EXAMPLES

The present invention will be further described based on examples but embodiments of the invention are by no means limited to these examples.

Preparation of Radiation Image Conversion Panel

Example 1

Using deposition apparatus (1) as shown in FIG. 3, a stimulable phosphor (CsBr: 0.002Eu) was deposited on one side of support (11) formed of a carbon fiber reinforced resin to form a stimulable phosphor layer (12), according to the following procedure. First, the stimulable phosphor (CsBr: 0.002Eu) was filled into a resistance heating crucible, a support (11) is set on a rotating support holder (4) and the spacing between the support (11) and a evaporation source (3) was adjusted to 500 nm. Subsequently, the inside of the deposition apparatus (1) was evacuated, then, Ar gas was introduced therein and the vacuum pressure was adjusted to a pressure of $5.0\times10^{-3}$ Pa, and thereafter the support (11) was maintained at a temperature of 100° C. while rotating the support (11) at a rate of 10 rpm. Then, the resistance heating crucible was heated to deposit the stimulable phosphor and vacuum deposition was stopped when the thickness of a stimulable phosphor layer (12) reached 500 μm. Subsequently, the stimulable phosphor layer (12) was put into a protective layer bag in a dry air atmosphere to obtain a radiation image conversion panel, as Example 1 relating to this invention, having a structure in which the stimulable phosphor layer was closely shielded.

Examples 2 to 4

Radiation image conversion panels of Example 2 to 4 were prepared similarly to Example 1, provided that the degree of vacuum inside the deposition apparatus (1) was respectively changed to pressures of $1.0\times10^{-2}$ Pa $5.0\times10^{-2}$ Pa and $1.0\times10^{-1}$ Pa as shown in Table 1.

Comparative Examples 1 and 2

Radiation image conversion panels of Comparative Example 1 and 2 were prepared similarly to Example 1, provided that the degree of vacuum inside the deposition apparatus (1) was respectively changed to pressures of $5.0\times10^{-4}$ Pa and $1.0\times10^{-3}$ Pa.

Evaluation

The thus obtained radiation image conversion panels of Examples 1 to 4 and Comparative Examples 1 and 2 were each measured with respect to X-ray diffraction pattern to determine the ratio ($I_2/I_1$) of the second peak intensity ($I_2$) to the first peak intensity ($I_1$) and evaluated with respect to sharpness, extent of layer peeling and shock resistance.

(1) Measurement of Diffraction Pattern

Using powder X-ray diffraction apparatus JDX-11RA (available from Nippon Denshi Co., Ltd.) radiation image conversion panels obtained in Example 1 to 4 and Comparative Example 1 and 2, were each measured with respect to diffraction pattern of the crystal lattice plane perpendicular to the direction of the highest growth rate at incident angles ranging from 10° to 70° to determine a ratio ($I_2/I_1$) of the second peak intensity ($I_2$) to the first peak intensity ($I_1$) in the respective diffraction patterns. Results thereof are shown in Table 1, in which crystal lattice planes of the first peak intensities of Examples 1 to 4 and Comparative Examples 1 and 2 were each a (200) plane.

(2) Sharpness

After a CTF chart was adhered to the respective radiation image conversion panels of Examples 1 to 4 and Comparative Examples 1 and 2, each was exposed to 10 mR of X-ray at a bulb voltage of 80 k VP-P (at a distance from bulb to the object of 1.5 m). Thereafter, the phosphor layer side of the panel was irradiated with semiconductor laser light (690 nm, a power of 40 mW on the panel) and the CTF chart was scanned with a semiconductor laser light beam (oscillation wavelength: 780 nm, beam diameter: 100 μm) to perform stimulation and the CTF chart image was read as stimulated emission radiated from the stimulable phosphor layer and photo-electrically converted by a photo-detector (photomultiplier) to obtain image signals. Based on these signal values, the modulation transfer function (MTF) of the image was determined. Sharpness of the radiation image was represented by a relative value, based on that of the radiation image conversion panel of Comparative Example 1 being 100. The MTF is a value at a space frequency of 1 cycle/mm. Results thereof are shown in Table 1.

(3) Layer Peeling

Radiation image conversion panel Examples 1 to 4 and Comparative Examples 1 and 2 were visually evaluated with respect to peeling of the stimulable phosphor layer. Results thereof are shown in Table 1. Levels of peeling of the layer were indicated based on the following criteria:
A: no peeling,
B: slight peeling,
C: significant peeling.

(4) Shock Resistance

Radiation image conversion panel Examples 1 to 4 and Comparative Examples 1 and 2 were visually evaluated after a 500 g iron ball was dropped onto the respective panels. Further, the respective radiation image conversion panels were each exposed to X-rays at a bulb voltage of 80 k Vp and then scanned with a He—Ne laser (633 nm) for stimulation. Stimulated emission radiated from the phosphor layer was received by the photo-receiver described above and converted to electric signals, which were reproduced as an image by an image reproduction apparatus and printed out using an outputting apparatus. The thus obtained printed image was visually evaluated as a measure of shock resistance. Results thereof are shown in Table 1.

Shock resistance was visually evaluated based on the following criteria:
A: no cracking was observed and a uniform image was obtained,
B: no cracking was observed but at a feeling level of being little conscious of image quality deficiency,
C: cracking was observed and slight image deficiency was noted but at a level acceptable in practice,
D: cracking was apparently observed and image deficiency was noted, and a level unacceptable in practice.

TABLE 1

| Panel | Vacuum (Pa) | $I_2/I_1$ | Sharpness | Layer Peeling | Shock Resistance |
|---|---|---|---|---|---|
| Example 1 | $5.0 \times 10^{-3}$ | 0.3 | 102 | B | C |
| Example 2 | $1.0 \times 10^{-2}$ | 0.5 | 103 | A | B |
| Example 3 | $5.0 \times 10^{-2}$ | 0.7 | 103 | A | A |
| Example 4 | $1.0 \times 10^{-1}$ | 0.8 | 103 | A | A |
| Comp. Example 1 | $5.0 \times 10^{-4}$ | 0.1 | 100 | C | D |
| Comp. Example 2 | $1.0 \times 10^{-3}$ | 0.2 | 101 | B | D |

As shown in Table 1, it was shown that as the vacuum pressure decreased or the degree of vacuum inside the deposition apparatus increased in the preparation of the radiation image conversion panels, the ratio ($I_2/I_1$) of the second peak intensity ($I_2$) to the first peak intensity ($I_1$) decreased, resulting in enhanced crystallinity. It was proved that a value of $I_2/I_1$ of less than 0.3 easily caused layer peeling, leading to a reduced shock resistance; on the contrary, an increase of the $I_2/I_1$ value made it difficult to cause peeling, leading to enhanced shock resistance. It was also shown that radiation image conversion panel Examples 1 to 4 exhibited slightly enhanced sharpness, compared to those of Comparative Examples 1 and.2. Thus, it was shown that radiation image conversion panels relating to this invention led to improved resistance to peeling and shock as well as enhanced sensitivity and image sharpness.

What is claimed is:

1. A method of preparing a radiation image conversion panel comprising on a support a stimulable phosphor layer, the method comprising:

depositing a stimulable phosphor onto the support to grow columnar crystals of the stimulable phosphor to form the stimulable phosphor layer, wherein said depositing is conducted with rotating the support using a vacuum deposition apparatus comprising a vacuum vessel having a support rotation mechanism and an evaporation source and prior to said depositing, the method further comprises:

mounting the support onto the support rotation mechanism and evacuating the vacuum vessel, and wherein the stimulable phosphor layer exhibits an X-ray diffraction pattern meeting the following requirement:

$$0.3 \leq I_2/I_1 \leq 1.0$$

wherein $I_1$ is an intensity of a highest peak and $I_2$ is an intensity of a second highest peak when the stimulable phosphor layer is subjected to X-ray diffractometry at incident angles in the range of from 10° to 70°; and the stimulable phosphor is represented by the following formula:

$$M^1X \cdot aM^2X'_2 \cdot bM^3X''_3 : eA$$

wherein $M^1$ is at least one alkali metal atom selected from the group consisting of Li, Na, K, Rb and Cs; $M^2$ is at least one divalent metal atom selected from the group consisting of Be, Mg, Ca, Sr, Ba, Zn, Cd, Cu and Ni; $M^3$ is at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X, X' and X" each are a halogen atom selected from the group consisting of F, Cl, Br and I; A is at least one metal atom selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are respectively $0 \leq a < 0.5$, $0 \leq b < 0.5$ and $0 < e < 1.0$.

2. The method of claim 1, wherein a crystal lattice plane exhibiting the highest peak is a (x00) plane in which x is 1, 2 or 3.

3. The method of claim 2, wherein x is 1 or 2.

4. The method of claim 2, wherein one of (100) and (200) planes exhibits the highest peak and the other one exhibiting the second highest peak.

5. The method of claim 1, wherein the stimulable phosphor is CsBr;eEu in which e is $0 < e < 1.0$.

* * * * *